United States Patent
Wills et al.

(10) Patent No.: US 7,081,996 B2
(45) Date of Patent: *Jul. 25, 2006

(54) ISOLATED POLARIZATION BEAM SPLITTER AND COMBINER

(75) Inventors: Gonzalo Wills, Ottawa (CA); Pierre D. Wall, Ottawa (CA); Kok-Wai Chang, Los Altos, CA (US); Fahong Jin, Fremont, CA (US); Xinglong Wang, San Jose, CA (US)

(73) Assignees: JDS Uniphase Corporation, San Jose, CA (US); JDS Uniphase, Inc. (CA)

( * ) Notice: Subject to any disclaimer, the term of this patent is extended or adjusted under 35 U.S.C. 154(b) by 558 days.

This patent is subject to a terminal disclaimer.

(21) Appl. No.: 09/901,580

(22) Filed: Jul. 11, 2001

(65) Prior Publication Data

US 2002/0012167 A1 Jan. 31, 2002

Related U.S. Application Data

(60) Provisional application No. 60/218,136, filed on Jul. 14, 2000.

(51) Int. Cl.
*G02B 5/30* (2006.01)
*G02B 27/28* (2006.01)

(52) U.S. Cl. ............... 359/484; 359/494; 359/495; 359/496; 359/497

(58) Field of Classification Search ........... 359/484, 359/495, 497, 494, 496
See application file for complete search history.

(56) References Cited

U.S. PATENT DOCUMENTS

| | | | |
|---|---|---|---|
| 4,178,073 A | 12/1979 | Uchida et al. | 350/151 |
| 4,239,329 A | 12/1980 | Matsumoto | 350/96.15 |
| 4,548,478 A | 10/1985 | Shirasaki | 350/377 |
| 5,204,771 A | 4/1993 | Koga | 359/281 |
| 5,689,359 A | 11/1997 | Kurata et al. | 359/281 |
| 5,727,109 A | 3/1998 | Pan et al. | 385/140 |
| 5,729,377 A * | 3/1998 | Bergmann | 359/249 |

(Continued)

FOREIGN PATENT DOCUMENTS

EP   0 786 681 A1   7/1997

OTHER PUBLICATIONS

"Yttrium Vanadate (YV04) Crystal—Special Crystal for Fiber Optics" pp. 1-3.

(Continued)

*Primary Examiner*—Drew A. Dunn
*Assistant Examiner*—Joshua L. Pritchett
(74) *Attorney, Agent, or Firm*—Hall, Vande Sande & Pequignot

(57) ABSTRACT

An isolated polarization beam splitter or combiner, for joining light from different inputs into one common port, and for dividing a beam of light into orthogonal polarizations. In both modes of operation, the splitter/combiner provides isolation preventing transmission of light in a reverse direction. As a splitter, a beam of light is separated through a birefringent material into sub-beams of orthogonal polarization components, and each sub-beam is passed through a non-reciprocal polarization rotator to rotate the polarization so that a reflected beam, or other counter-transmitted light cannot return on the same path through the birefringent material to the source. As a combiner, two separate beams of light are launched with known orthogonal polarizations into a first birefringent material, passed through a non-reciprocal polarization rotator and then combined as orthogonal polarizations into a single output port.

27 Claims, 9 Drawing Sheets

U.S. PATENT DOCUMENTS

| | | | |
|---|---|---|---|
| 6,014,256 A | 1/2000 | Cheng | 359/495 |
| 6,055,104 A | 4/2000 | Cheng | 359/495 |
| 6,175,448 B1 | 1/2001 | Xie et al. | 359/497 |
| 6,212,008 B1 * | 4/2001 | Xie et al. | 359/484 |
| 6,304,380 B1 * | 10/2001 | Doerr | 359/484 |
| 6,507,422 B1 * | 1/2003 | Fukushima | 398/79 |
| 6,711,311 B1 * | 3/2004 | Delisle et al. | 385/11 |

OTHER PUBLICATIONS

"MTI Corporation—A Single Source for All Single Crystal Substrates" pp. 1-8.

European Search Report and Annex, No. EP 01 30 6080.

* cited by examiner

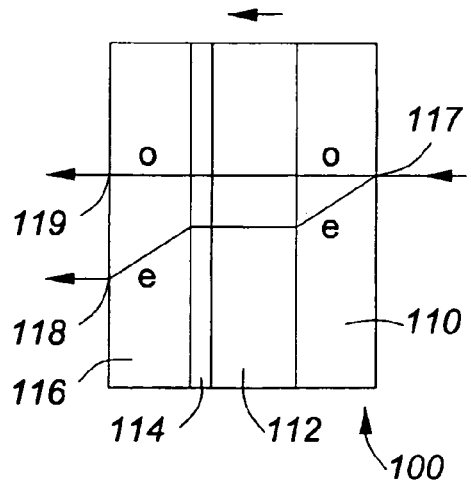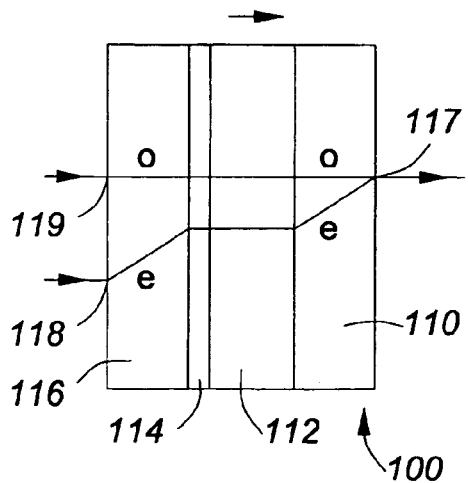
FIG. 1A   FIG. 1B
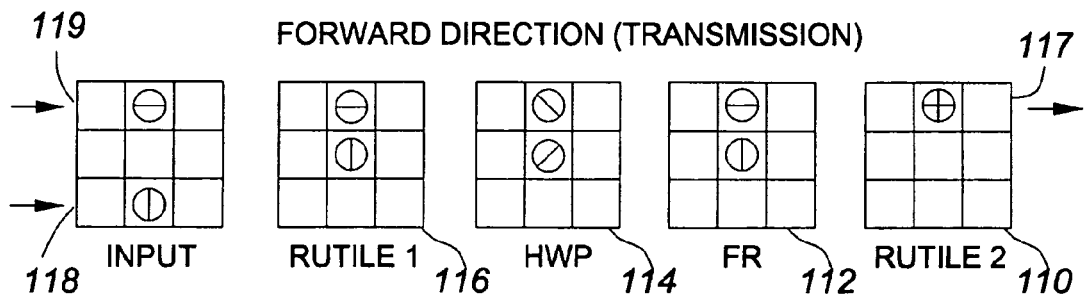
FIG. 1C
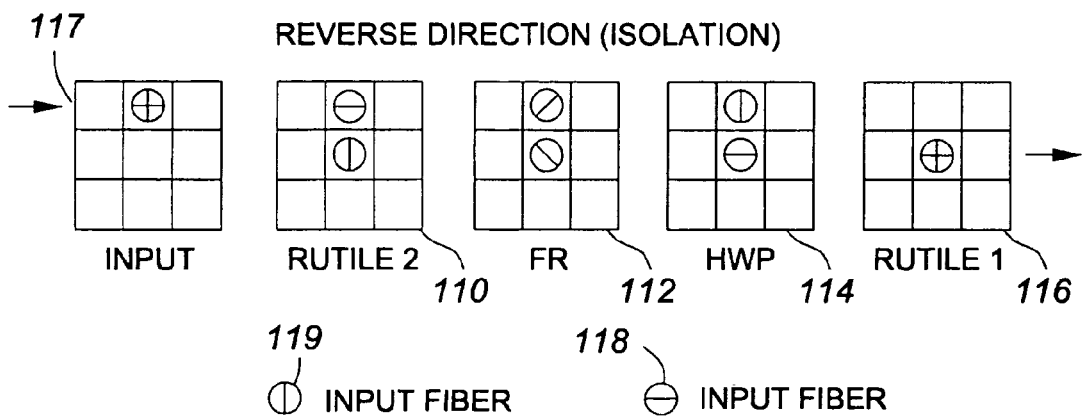
FIG. 1D

ISOLATED POLARIZATION BEAM SPLITTER AND COMBINER

This application claims priority from U.S. provisional application No. 60/218,136 filed Jul. 14, 2000 and from U.S. application Ser. No. 09/731,908 filed Dec. 8, 2000.

FIELD OF THE INVENTION

The present invention relates to an isolated polarization beam splitter or combiner, for joining light from different inputs into one common port, and for dividing a beam of light into orthogonal polarizations. In both modes of operation, the splitter/combiner provides efficient coupling in a transmission direction and isolation preventing transmission of light in a reverse, isolation direction.

BACKGROUND OF THE INVENTION

Polarization independent devices such as optical circulators and isolators generally require separating the input beam having an unknown polarization state, into two orthogonally polarized sub-beams. These sub-beams are routed through the isolating elements of the device such as reciprocal and non-reciprocal rotators and are combined at an output end. However, if the beams are launched in a backwards direction non-reciprocal elements ensure that the light does not couple back into the input port. Rutile crystals, and other birefringent crystals are well known for the purpose of separating an input beam into two orthogonally polarized sub-beams thereby serving as a polarization beam splitter, or operated in an opposite direction as a polarization beam combiner. Within this specification the term polarization beam splitter is used however it should be understood, that the same device serves as a polarization beam combiner operated in reverse.

It has been typical, for light propagating within these crystals to be collimated, most often by a graded index (GRIN) lens. In this instance a relatively large crystal is required to ensure separation of two beams that have diameters typically as large as 350 μm. However, recently, it was discovered that very small crystals, about $1/50^{th}$ the size of conventional crystals could be used with a non-collimated beam; using such small crystals substantially lessens the cost of manufacturing optical splitters/combiners, circulators or optical isolators.

A polarization beam combiner joins light from different inputs into one common port. This is commonly required, for example, for combining pump power from one or more lasers with an optical signal into an optical amplifier. A polarization splitter splits a beam of light into two sub-beams of orthogonal polarization components directed to two separate outputs. It is desired to provide isolation to prevent light from coupling back into the input port of the splitter. This is generally done by providing an external isolator, a pigtailing of polarization maintaining fiber, and a separate splitter.

Isolation for the combiner is more critical, as light coupled back to the laser source will cause damage to the laser. An external isolator is provided between the lasers and the combiner. However, laser pump power is expensive to provide, and using a separate isolator and combiner increases insertion losses.

It is an object of the present invention to provide a combiner, which can provide the isolation function and increase pump coupling efficiency. It is a further object to provide a smaller, more cost effective isolated polarization splitter/combiner using fewer parts and less polarization maintaining fiber.

A further disadvantage of prior art object space polarization beam splitters/combiners is that there is a difference in optical path length for the two separated orthogonal polarizations traveling through a birefringent crystal. Using birefringent crystals where the light propagating therethrough is not collimated, leads to an increase in insertion loss due to a defocusing or a need to compensate for the path length difference. The sub-beams follow a slow axis (extraordinary), and a fast axis (ordinary), which correspond to this difference in optical path length. It is typical after separating the beam into its two orthogonal polarization states through a rutile crystal to couple the light into two fiber ends. However, the two focus spots from the crystal do not lie on a same focal plane. This is due to the optical path length difference for the e-ray and the o-ray through the crystal. Generally pairs of optical fibers are held securely in a fixed manner in an optical fiber tube. If a tube is used to couple light from the crystal aligned at the focus spot of one of the beams, the other focus spot will not be in focus at the tube end, and light from either the e-ray or o-ray path will couple poorly.

It is a further object of this invention to provide an isolated beam splitter/combiner which lessens or obviates this optical path length difference, having substantially same optical path lengths for two split or combined beams propagating therethrough.

SUMMARY OF THE INVENTION

In the present invention, isolation based on polarization diversity is used within the splitter and combiner to prevent back-reflected or other counter-propagating light from coupling through the splitter/combiner into the transmission source. As a splitter, a beam of light is separated through a polarization beam splitter into sub-beams of orthogonal polarization components, and each sub-beam is passed through a non-reciprocal polarization rotator to rotate the polarization so that a reflected beam, or other counter-transmitted light cannot return on the same path through the polarization beam splitter to the source. As a combiner, two separate beams of light are launched with known orthogonal polarizations into a polarization dependent beam steering means, passed through a non-reciprocal polarization rotator and then combined as orthogonal polarizations into a single output port.

Accordingly, the present invention provides an isolated polarizing optical beam splitter/combiner for combining orthogonally polarized beams of light into a single port in a combining direction, or for splitting a beam of light into orthogonally polarized beams of light to spatially separated ports in a splitting direction comprising:

a single port for launching a beam of light into the splitter/combiner, or for outputting a combined beam of light from the splitter/combiner;

a pair of spaced apart ports for launching orthogonally polarized beams of light into the splitter/combiner, or for outputting orthogonally polarized beams of light from the splitter/combiner;

a first polarization beam splitter optically coupled to the single port, oriented to provide different optical paths for two orthogonally polarized beams of light;

a second polarization dependent beam steering means optically coupled to the pair of spaced apart ports, oriented to provide different optical paths for two orthogonally polarized beams of light;

a non-reciprocal rotator between the first polarization beam splitter element and at least an element of the second polarization dependent beam steering means for rotating a polarization of each of two orthogonal beams of light and maintaining the orthogonal relationship between them, said non-reciprocal rotator adapted to be driven for transmission in a selected combining direction or a splitting direction, wherein, when driven in the combining direction, the non-reciprocal rotator permits light to propagate from the pair of ports to the single port, and prevents light from coupling between the single port and the pair of ports, or wherein, when driven in the splitting direction, the non-reciprocal rotator permits light to propagate from the single port to the pair of ports, and prevents light from coupling between the pair of ports and the single port.

In a further embodiment, the present invention provides an isolated polarizing optical beam splitter/combiner as described above, wherein the first polarization beam splitter element comprises a birefringent element having an o-ray path and an e-ray path and the second polarization dependent beam steering means comprises a birefringent element having an e-ray path and an o-ray path such that the e-ray path of the second birefringent element is optically coupled with the o-ray path of the first birefringent element and the o-ray path of the second birefringent element is optically coupled with the e-ray path of the first birefringent element, wherein the different optical paths for two orthogonally polarized beams of light passing through both the first and second birefringent elements have a substantially same optical path length.

In a still further embodiment of the present invention there is provided an isolated polarizing optical beam splitter/combiner for combining orthogonally polarized beams of light into a single beam of light in a combiner mode of operation, and for splitting a beam of light into orthogonally polarized beams of light in a splitter mode of operation comprising:

a first birefringent crystal having different optical paths for light of orthogonal polarizations converging at a single first port for combining orthogonally polarized beams of light in the combiner mode, or diverging from the single first port for splitting orthogonal beams of light from a beam of light in the splitter mode and having a rotational axis;

a second birefringent crystal having different optical paths for light of orthogonal polarizations converging from a second and a third spaced apart ports for reducing a spatial separation between two orthogonal beams of light in the combiner mode, or diverging to the second and third spaced apart ports for spatially separating orthogonal beams of light split by the first birefringent element in the splitter mode and having a rotational axis;

a non-reciprocal polarization rotator disposed between the first and second birefringent crystals for rotating the polarization of orthogonally polarized beams of light to a first state in a transmission direction for optically coupling the first port to the second and third ports, and for rotating the polarization of orthogonally polarized beams of light to a second state in an isolation direction which does not permit coupling between the first port and the second and third ports.

In a further embodiment, the present invention comprises an isolated polarizing optical beam splitter/combiner including a birefringent beam splitter, a pair of birefringent elements having parallel wedge surfaces, and a non-reciprocal rotator disposed between the pair of birefringent elements, wherein the pair of spaced apart ports are symmetrically disposed about an axis of an input lens for launching orthogonally polarized collimated beams at equal and opposite angles into a first of the pair of birefringent elements and for receiving orthogonally polarized focused beams and further comprising a lens optically coupled to the single port for collimating a beam of light launched into the splitter/combiner or for focusing a combined beam of light output from the splitter/combiner.

Advantageously, this provides an efficient and cost effective device for integrating a laser source to a polarizing beam combiner with less loss and smaller size.

BRIEF DESCRIPTION OF THE FIGURES

Further advantages will be clear to persons of skill in the art with reference to the following drawings by example only in which:

FIG. 1a shows a schematic view of an isolated polarization beam splitter/combiner wherein a Faraday rotator and a half wave plate are disposed between two birefringent crystals, the device is shown operating as a beam splitter;

FIG. 1b shows a schematic view of the device of FIG. 1a operating as a beam combiner;

FIG. 1c shows the polarization states for the beams passing through the combiner of FIG. 1b;

FIG. 1d shows the polarization states for light reflected or counter-propagated through the combiner of FIG. 1b in a reverse direction and isolated from the input ports;

FIG. 4b illustrates the states of polarization and position of light launched into the device shown in FIG. 4a;

DETAILED DESCRIPTION OF PREFERRED EMBODIMENTS

Figure 2A:
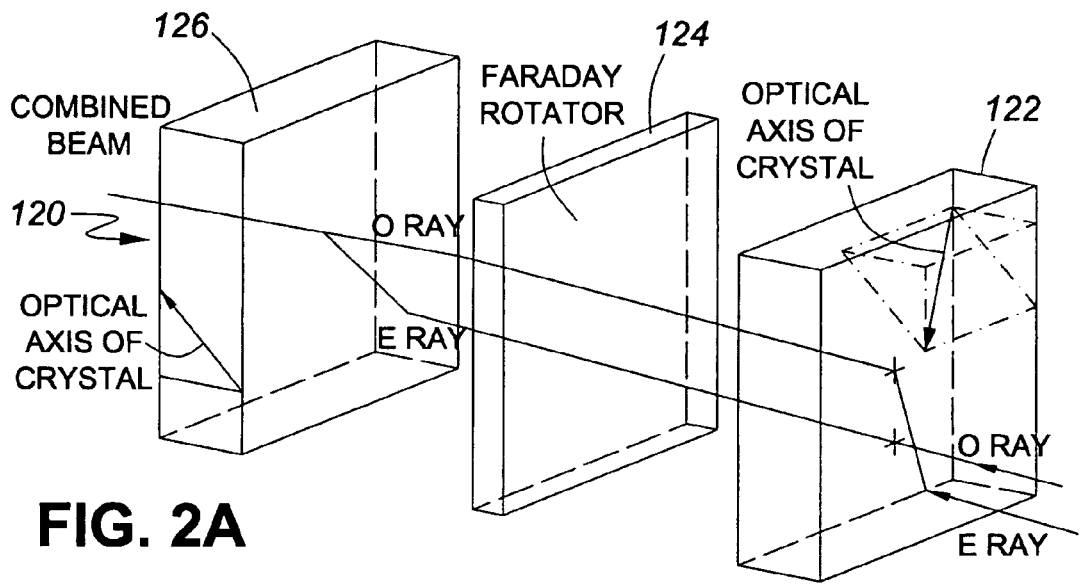
FIG. 2a shows a schematic view of an alternative isolated polarization beam splitter/combiner, wherein the axes of the birefringent crystals are rotated relative to each other with a Faraday rotator between them.
Figure 2B:
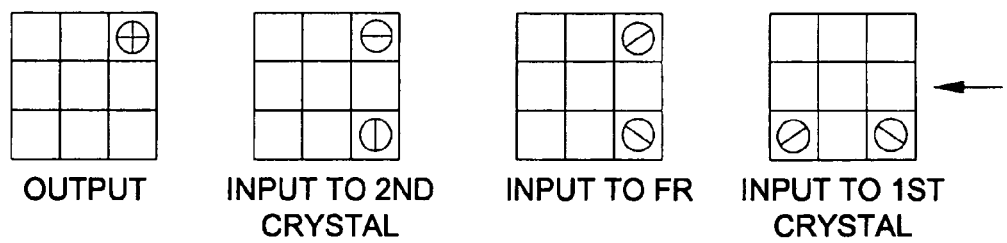
FIG. 2b shows the polarization states for light transmitted through the device of FIG. 2a operating as a combiner.
Figure 2C:
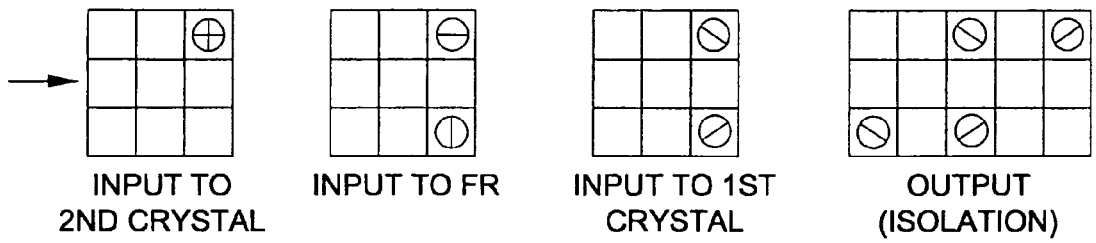
FIG. 2c shows the polarization states for light reflected in a reverse direction through the device of FIG. 2a operating as a combiner, isolated from coupling into the two input ports.

FIG. 1*a* shows an embodiment of the invention operating as a polarization beam splitter 100 in accordance with the present invention wherein a Faraday rotator 112 and a half wave plate 114 are sandwiched between two birefringent crystals 110 and 116. A first beam splitter element in the form of a birefringent crystal 110 is shown optically coupled with a second beam splitter element, also a birefringent crystal 116 of equal length.

Materials for use as a polarization beam splitter include, for example, rutile ($TiO_2$), yttrium vanadate ($YVO_4$), magnesium fluoride ($MgF_2$), quartz ($SiO_2$), lithium niobate ($LiNbO_3$), and calcite ($CaCO_3$). It is preferred to use high birefringent crystals as polarization beam splitter elements, because a very small crystal can be used with an uncollimated beam. Accordingly, all components are significantly smaller resulting in a smaller beam splitter/combiner assembly.

A non-reciprocal polarization rotator, which can be collectively a Faraday rotator 112 and a half-wave plate 114, is disposed between the crystals 110 and 116. The half wave plate 114 has an optical axis at 22.5 degrees. The Faraday rotator 112 rotates light by 45 degrees. Both crystals 110 and 116 have axes oriented at 47.8 degrees as seen from the side plane of the crystal to obtain maximum walk-off between the ordinary and extraordinary polarizations for rutile. An uncollimated beam of light is launched into the device at the input port 117 as shown on the left and split into an o-ray and an e-ray which follow different diverging paths. The Faraday rotator 112 rotates the o-ray and e-ray each by 45 degrees. The o-ray and e-ray undergo another rotation by 45 degrees in a reverse direction when passing through the half wave plate 114 thus returning the sub-beams to their original polarization states. The o-ray and the e-ray continue through the second crystal 116 again, and since the axes of the crystals are oriented substantially parallel, the o-ray and e-ray continue to diverge on different paths to the two output ports 118 and 119 respectively. Outputs 118, 119 are spaced apart proportionally to the combined length of the two crystals 110, 116. As the sub-beams are orthogonally polarized at the outputs 118,119, polarization maintaining fiber may be used to pick up the output sub-beams, depending upon the application.

If light is launched into the device 100 in a reverse direction, i.e. it is launched into output ports 118 and 119, it will not couple back into input port 117, thus providing isolation in a reverse direction. This is due to the non-reciprocal rotation by the Faraday rotator 112. Light launched on the e-ray and o-ray paths from the ports 118 and 119 will be rotated by the half wave plate 114 and again by the Faraday rotator 112, this time in the opposite direction, for a net rotation of 90 degrees. Thus the e-ray is presented to the crystal 110 as an o-ray that passes through the crystal 110 above the port 117. The o-ray is presented to the crystal 110 as an e-ray that follows a diverted path below the port 117. No light is coupled into the port 117, providing isolation.

FIG. 1*b* shows the same device 100 operated as an isolated polarization combiner. Light of orthogonal polarizations is launched into the pair of ports 118, 119 with the ordinary and extraordinary polarizations oriented to select converging paths through the birefringent crystal 116. The half wave plate 114 rotates the polarization of the two beams by 45 degrees. The Faraday rotator 112 is driven in the combining direction, reversing the direction of the magnetic field, as indicated by the arrow. The polarizations of light passing through the Faraday rotator 112 are then rotated 45 degrees in a reverse direction, thus returning the beams to their original polarization states. The beams continue on converging paths of the birefringent crystal 110 to the single port 117. FIG. 1*c* illustrates the polarization state of each beam as they pass through each element of the combiner.

If light is launched in a reverse direction, i.e. it is launched into port 117 when the Faraday rotator is driven in the combining direction, it will not couple to the ports 118,119, again due to the non-reciprocal rotator 112, thus, providing isolation. Light launched into port 117 is divided into e-ray and o-ray. The polarizations of each beam are rotated 90 degrees by the Faraday rotator 112 and the half wave plate 114, presenting the e-ray to the crystal 116 as an o-ray and the o-ray to the crystal 116 as an e-ray. The light follows a path through the second crystal 116, similar to that in the first crystal 110 combining to a single point between the ports 118, 119. Thus, no light couples to the ports 118,119 shown in phantom in FIG. 1*d*. FIG. 1*d* illustrates the polarization state of each reflected beam as they pass through each element of the combiner in reverse direction.

Figure 2D:
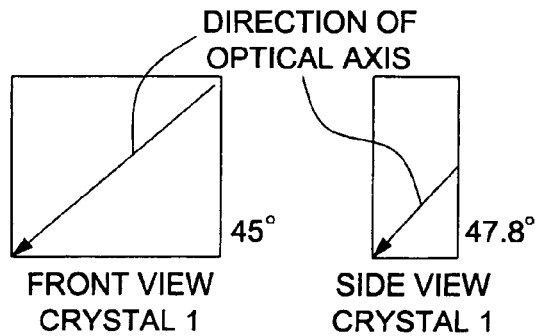
FIG. 2d shows the first birefringent crystal of FIG. 2a from a front view illustrating the rotational vector and a side view illustrating the walk-off vector, which comprise the optical axis of the crystal.

FIG. 2*a* shows a schematic isometric view of an alternative isolated polarization beam splitter/combiner 120, in accordance with the present invention. A first birefringent element 122 and a second birefringent element 126 are optically coupled through a single Faraday rotator 124. The axis of the first birefringent crystal 122, shown as arrows on the front face and the averted side face in FIG. 2*d*, and the axis of the second crystal 126, shown in the isometric view 2*a*, are rotated relative to each other by 45 degrees in the front planes of the crystals 122, 126. For example, the crystal 126 has a rotational axis at zero degrees, or vertical, and the crystal 122 has a rotational axis at 45 degrees. In this case the total net rotation from the two crystals is equal to the rotation of the Faraday rotator, ie. 45 degrees. As a combiner 120, the first birefringent element 122 splits two polarizations, the Faraday rotator 124 rotates each sub-beam by 45 degrees and the optical axis of the second birefringent element 126 is rotated by 45 degrees with respect to the optical axis of the first birefringent element 122 to combine the sub-beams. With the magnetic field driven in the opposite direction, the device 120 acts in the same way as a splitter. It should be noted that the optical axis of both crystals 122, 126 also includes a component at 47.8 degrees, viewed from the side face, for maximum walk-off beam separation with the minimum thickness of crystal. The 45 degrees orientation refers to rotation on the front or input face of the crystal, also referred to here as 'rotational axis'.

The rotation of the optical axes, measured from the front face of the birefringent elements must cooperate to maintain the orthogonal relationship between the two beams. To do so the axes can be arranged parallel, at 180 degrees, ie. antiparallel, or at complimentary 45 degree angles. The axes are depicted as vectors, the arrowhead indicating the direction of walk-off. The relationship between the rotation of the birefringent walk-off crystals and the polarization rotator is such that there will be efficient coupling in a transmission direction from either e-ray to e-ray and o-ray to o-ray, or from e-ray to o-ray and from o-ray to e-ray. Efficient coupling is defined as substantially all light being coupled to the ports. At the same time coupling is substantially prevented in an isolation direction. By contrast, a different relationship of rotations of the birefringent walk-off crystals and the polarization rotators will result in inefficient coupling in at least one transmission direction (ie. combining or splitting) with significant loss of light.

Figure 3:
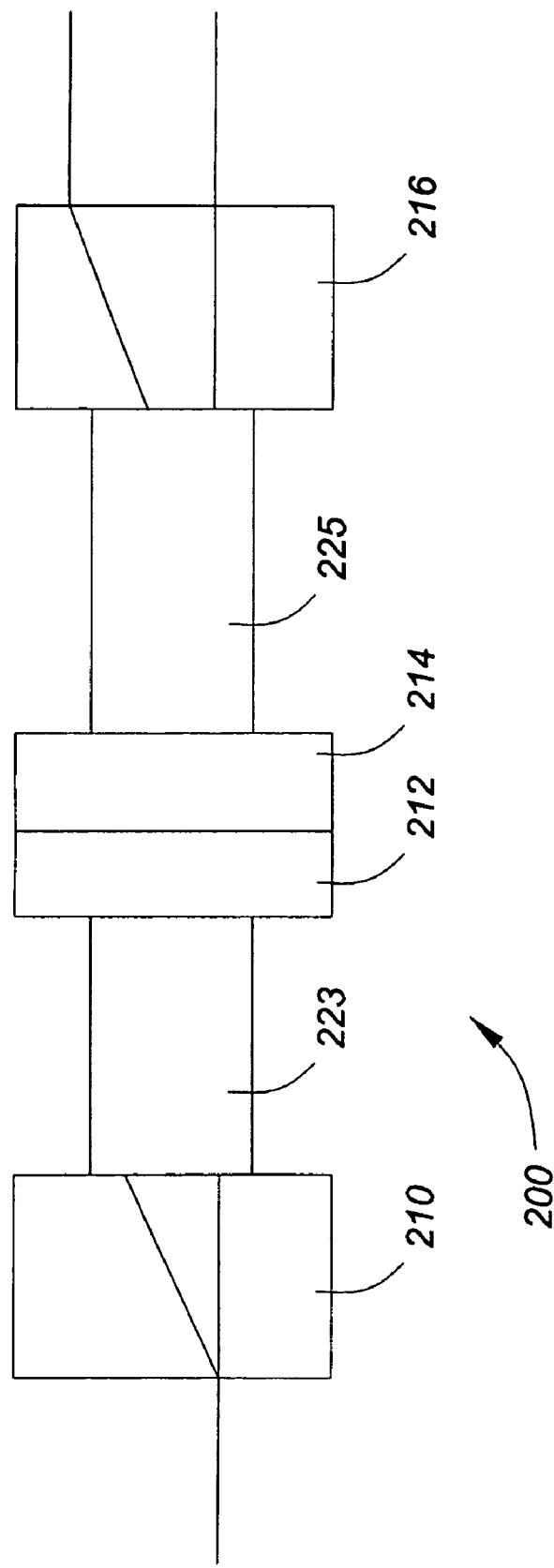
FIG. 3 shows a schematic view of another alternative isolated polarization beam splitter/combiner including collimating and focusing lenses for providing a collimated beam to the non-reciprocal rotator.

FIG. 3 A further embodiment of the present invention 200 includes lenses 223, 225 to receive the sub-beams from the first crystal 210 and to collimate the sub-beams directed to the non-reciprocal rotator 212, 214 and to refocus the sub-beams prior to passing the light through the second crystal 216. Since the light from the crystal is diverging and no longer a point source, graded index (GRIN) lenses less than a quarter pitch can be used. Of course, other aspheric lenses can be used. Advantageously, coupling is improved since the magnification is 1:1.

Figure 4A:
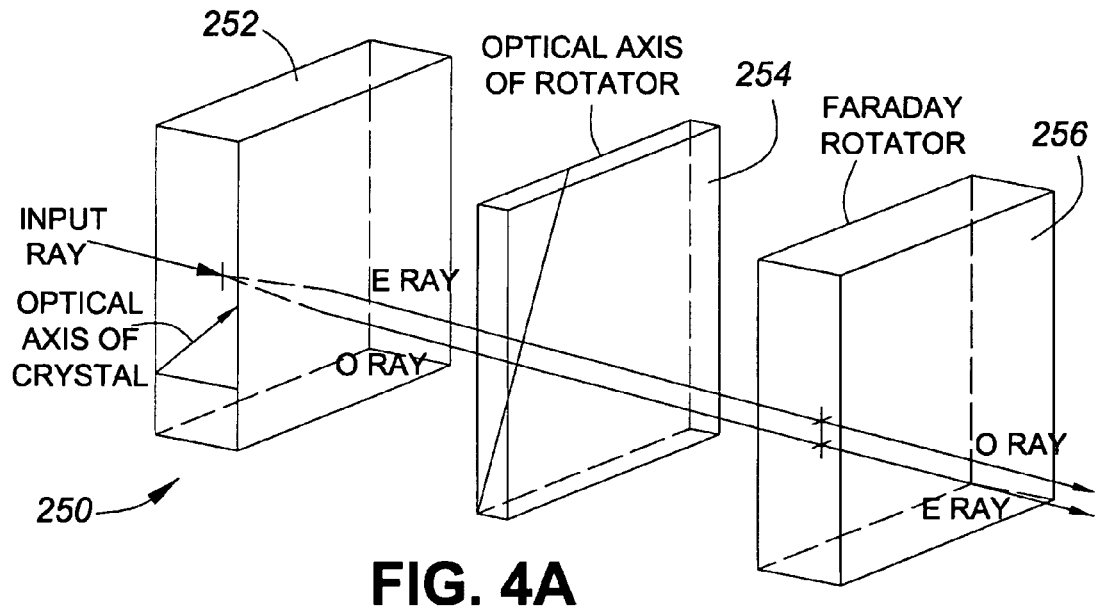
FIG. 4a shows an alternative isolated polarization beam splitter using a single birefringent crystal.

FIG. 4a shows another embodiment of an isolated polarization beam splitter 250. A first crystal 252 splits the orthogonal polarizations into sub-beams. The single crystal 252 is dimensioned to provide sufficient beam separation. The sub-beams are passed through a half wave plate 254 with its optical axis at 22.5 degrees and a Faraday rotator 256, which together rotate the sub beams by 90 degrees in the forward beam splitting direction. The non-reciprocal Faraday rotator 256 leaves the sub-beams unchanged in the reverse direction, thus providing isolation. This configuration cannot provide isolation as a beam combiner, however.

As in the embodiment of FIG. 2a, a simpler embodiment can be obtained by omitting the half wave plate and having only one Faraday rotator 256 for rotating the sub beams by 45 degrees. At the outputs, the fast and slow axes of the receiving polarization maintaining fibers are oriented in such a way as to properly receive the two orthogonal beams from the Faraday rotator 256.

Figure 4B:
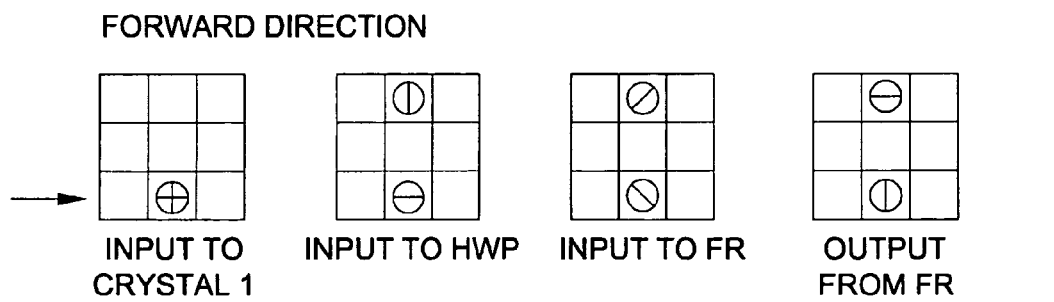
Figure 4B:
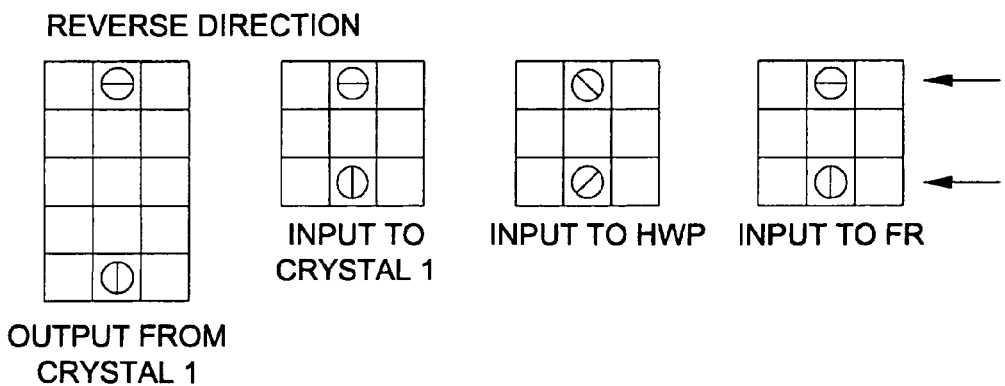

FIG. 4b shows the polarization states and position of a beam launched in the forward splitting direction, and isolation of the beams launched in the reverse direction.

Figure 5A:
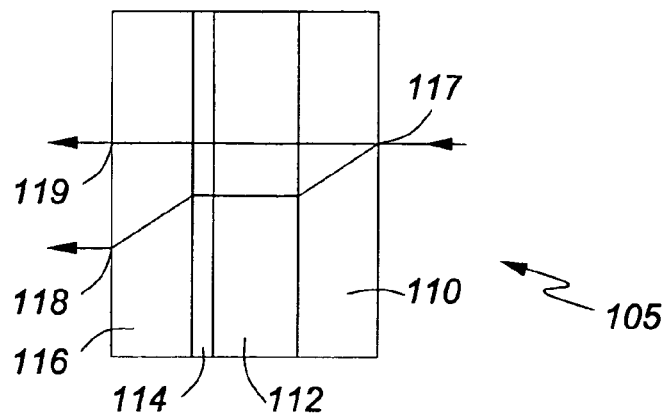
FIG. 5a shows a schematic view of an alternative isolated polarization beam splitter/combiner having equal path lengths for the ordinary and extraordinary rays.

Similar to the embodiment of FIG. 1a, an isolated beam splitter/combiner 105 having equal path lengths is shown in FIG. 5a. As in FIG. 1a, a Faraday rotator 112 and a half wave plate 114 are disposed between two birefringent crystals 110 and 116. The direction of operation of the magnetic field on the Faraday rotator 112 determines whether the device is a splitter or a combiner. A first beam splitter in the form of a birefringent crystal 110 is shown optically coupled with a second crystal 116 of equal length. In this case however, the rotation of the beams through the half wave plate 114 and Faraday rotator 112 is 90 degrees with the result that the o-ray path of the crystal 110 is coupled to the e-ray path of the crystal 116, and the e-ray path of the crystal 110 is coupled to the o-ray path of the crystal 116.

Figure 5B:
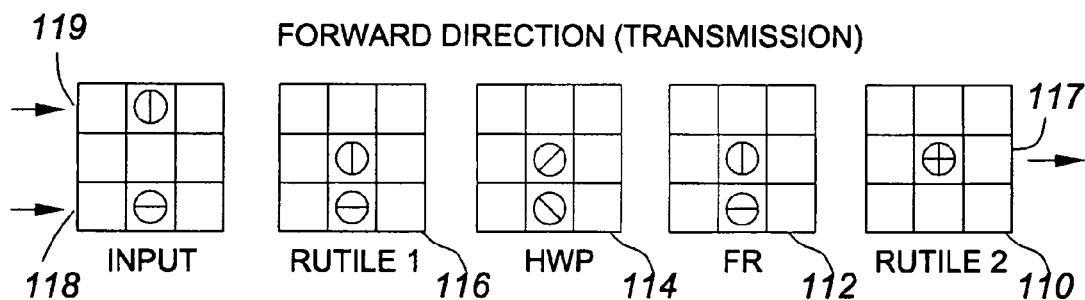
FIG. 5b illustrates the states of polarization and position of light launched into the device shown in FIG. 5a as a combiner.
Figure 5C:
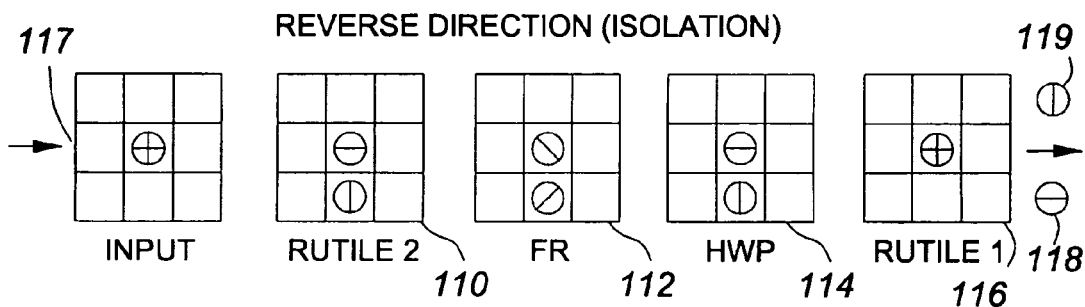
FIG. 5c illustrates the states of polarization and position of light reflected in a reverse direction through the device shown in FIG. 5a isolated from coupling into the two input ports of the combiner.

FIGS. 5b and 5c illustrate the state of polarization for light passing through the device of FIG. 5a driven as a combiner in the transmission and isolation direction respectively. The device 105 receives two input beams at ports 118,119 from separate fibers or waveguides as shown to the left in FIG. 5b. The birefringent crystal 116 moves the e-ray and the o-ray closer as shown by the output from crystal 1. The beams then pass through the half wave plate 114 which rotates their polarization states 45 degrees, and the Faraday rotator 112 which rotates the polarization by an additional 45 degrees, such that at the output of the Faraday rotator 112 each of the two beams is rotated by 90 degrees and thus the e-ray is presented to the birefringent crystal 110 as an o-ray and the o-ray is presented to the birefringent crystal 110 as an e-ray. The birefringent crystal 110 then combines the e-ray and the o-ray by moving the two beams towards each other to port 117.

FIG. 5c shows the reverse path for this device 105 wherein the beam of light is isolated from traveling in a reverse direction. On this reverse path, the common input beam at port 117 is split into an e-ray and an o-ray by the birefringent crystal 110. The e-ray and the o-ray then pass through the Faraday rotator 112 and the half wave plate 114. Due to the non-reciprocal nature of the Faraday rotator 112 the e-ray and the o-ray return to the same polarization state at the output from the half wave plate 114 as they were at the output from crystal 110. The birefringent crystal 116 then combines the e-ray and the o-ray in a position away from either one of the two input ports 118,119, shown in phantom, thus isolating them. Alternatively, the direction of the magnetic field of the device is reversed so that it becomes a polarization beam splitter separating an input beam of light from one common fiber into two output beams of orthogonal polarization and, in addition, blocking light in a backward direction analogously as explained above for the case of the polarization beam combiner.

Figure 6:
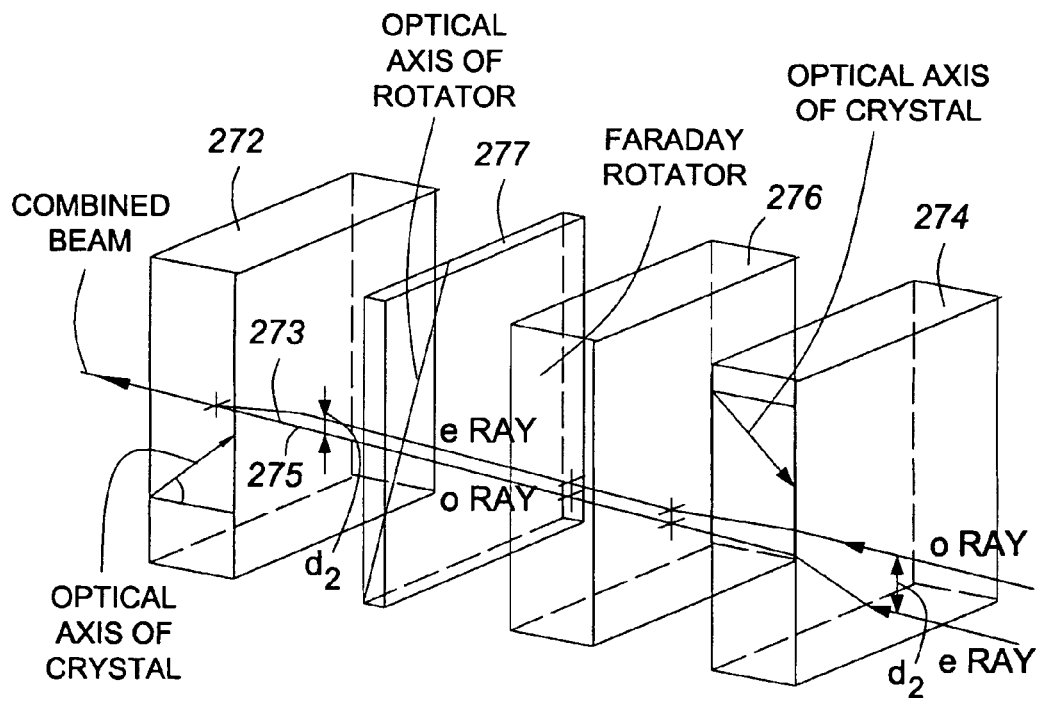
FIG. 6 shows a schematic expanded isometric view of a device similar to the embodiment of FIG. 5*a*.

Referring now to FIG. 6, in accordance with an embodiment of the invention, a first beam splitter/combiner, in the form of a birefringent crystal 272, is shown optically coupled with a second crystal 274 of equal length. A non-reciprocal polarization rotator, preferably a combination of a Faraday rotator 276 and a half wave plate 277, is disposed between the rutile crystals 272 and 274. Although the components 272, 274, and 276, 277 are shown separated, in practice they are contacting one another having a thin layer of light transmissive adhesive therebetween, and/or alternatively, an antireflective coating therebetween. Physically coupling elements of this type is well known in the art of optical circulators and isolators. FIG. 6 illustrates that the optical axes of the crystals 272 and 274 are oriented 180 degrees to each other, such that the o-ray path and e-ray path of the first rutile crystal 272 are coupled to the e-ray path and o-ray path of the second rutile crystal 274, respectively. The thicknesses of the crystals 272, 274 and the orientation of the axes are selected to provide a desired beam separation. The materials can be selected for different properties and may be different in the two crystals 272, 274, for instance $YVO_4$ and rutile. Of course, in the case of different crystal materials, equal path length must be measured as equal optical path lengths, not merely equal physical path lengths.

In operation an uncollimated beam of light is launched into an input port along an optical axis of the crystal 272 at an end face thereof having mixed polarization. The beam is then split into sub-beams indicated by principal rays in the FIG. 6; the e-ray follows the e-ray path of the crystal 272 and the o-ray follows the o-ray path of the crystal 272. When the sub-beams, exit the crystal 272 at sub-ports 273,275, they are separated by a distance "d1". For clarity and simplicity, this is shown by the principal rays. These beams are then rotated by the Faraday rotator 276 and half wave plate 277 by 90° and are presented in orthogonal linear polarization states to the input to crystal 2. Thus the e-ray is presented to the second rutile crystal 274 as an o-ray after it has been rotated. The o-ray exiting the first rutile crystal 272 is presented to the second crystal 274 as an e-ray. By so doing, the two rays, or sub-beams following the two rays, are further separated to a distance "d2". Advantageously, it can be seen that the optical path lengths of the two sub-beams diverging from the input beam are substantially equal.

Figure 7:
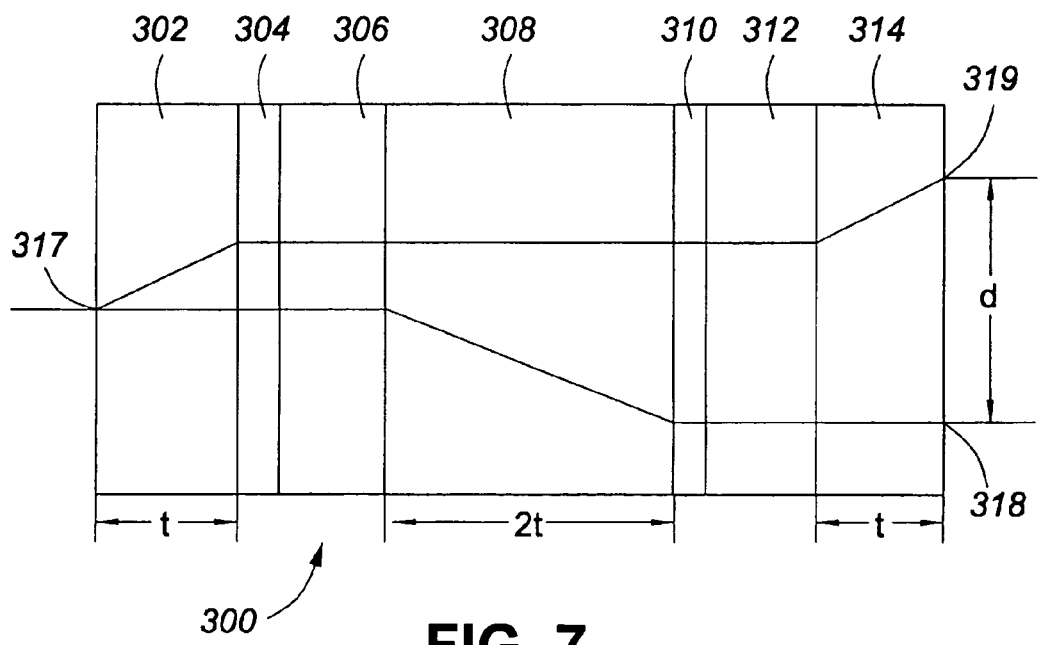
FIG. 7 illustrates an alternative embodiment of the present invention employing two-stage isolation.

Advantageously this invention provides a way of coupling light that is made polarization diverse efficiently from a small crystal, without suffering from the drawbacks of unequal path lengths using uncollimated light. In many instances, the device in accordance with this invention is used with polarization maintaining fiber coupled to the spaced apart ports disposed at an end face of the second rutile crystal 274 or to all of its ports, including the port disposed at an end face of the first crystal 272. Polarization maintaining fiber may be used, for example, to employ a phase difference of the combined orthogonally polarized beams to achieve a mixed polarization output FIG. 7 is a schematic illustration of a further embodiment 300 in accordance with the present invention. The beam splitter/combiner 300 comprises a first birefringent element 302, a first stage of non-reciprocal rotator including a half wave plate 304 and Faraday rotator 306 between the first birefringent element 302 and a second birefringent element 308. A second stage of non-reciprocal rotator including a half wave plate 310 and Faraday rotator 312 is provided between the second birefringent element 308 and a third birefringent element 314. By providing two stages of non-reciprocal rotators, isolation is increased, meaning that reflected light is directed farther from the input ports. The separation d between the pair of ports 318, 319 as a splitter is also increased in relation to the increased length of birefringent elements. To avoid defocusing at the outputs, an equal length of extraordinary and ordinary path should be provided for each beam. This is accomplished by providing the second birefringent element 308 with a length 2 t and the sum of the first and third birefringent elements 302, 314 also equal to 2 t. The first and third birefringent elements 302, 314 need not be equal to each other in length, as shown here, as long as the sum is 2 t.

Figure 8:
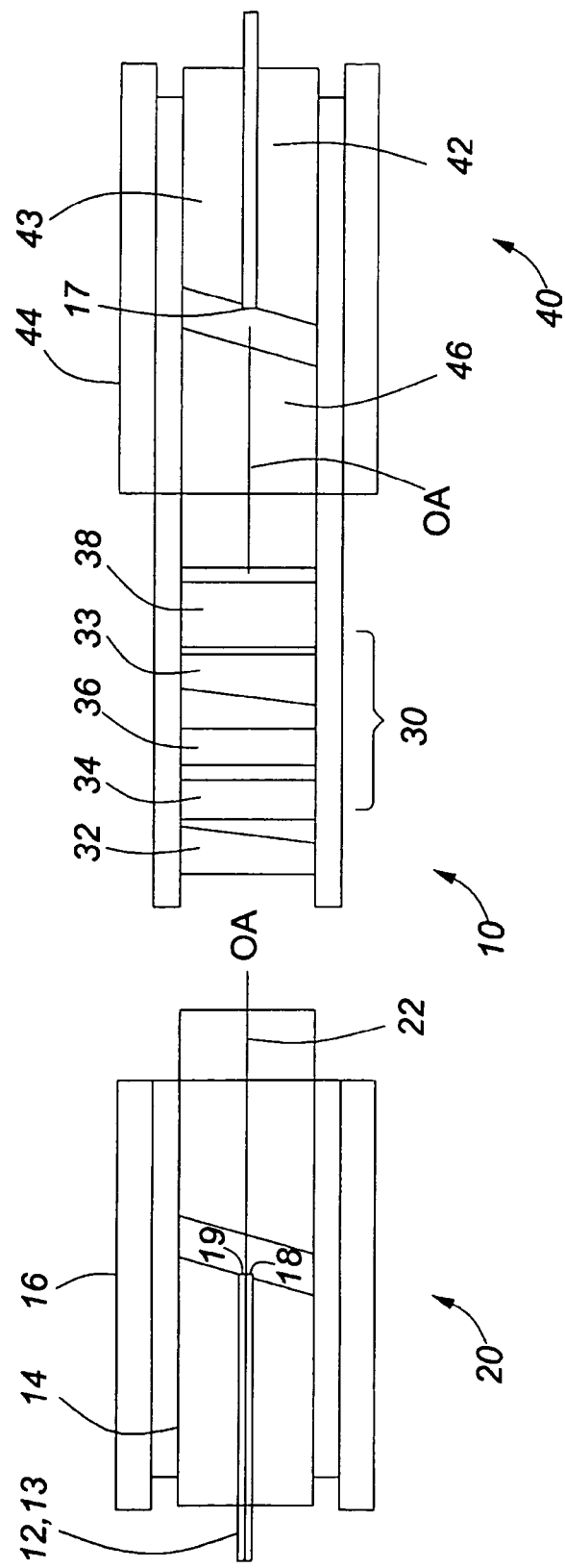
FIG. 8 illustrates a schematic view of a further embodiment of a polarization beam splitter/combiner for acting on a collimated beam, in accordance with the present invention.

FIG. 8 illustrates a schematic view of a further embodiment of a polarization beam splitter/combiner for acting on a collimated beam. The splitter/combiner is shown generally at 10 consisting of three elements. First a dual fiber collimator 20 comprises two spaced apart ports 18,19 comprising fiber ends of input or output fibers 12,13 and a lens 22. For most applications the fiber 12,13 will be polarization maintaining fiber. Fibers 12,13 are supported in a ferrule 14 and aligned in a sleeve 16 in order to position the fiber ends symmetrically about an optical axis OA of the lens 22. The lens 22 focuses light from the splitter/combiner 10 into the fibers 12,13, and collimates light from fibers 12,13 into the splitter/combiner 10. A second element consists of an isolated splitter/combiner core 30. The core 30 includes a first polarization dependent beam steering means including a pair of wedge shaped birefringent elements 32,33, a non-reciprocal polarization rotator including a Faraday rotator 34 and a half wave plate 36 and a second polarization beam splitter element 38. The Faraday rotator 34 and half wave plate 36 are disposed between the wedge elements 32, 33. A sleeve 39 supports and aligns the core elements. A third element, a single fiber collimator 40 comprises a single port 17 at an end of a single fiber 42. The fiber 42 is supported in a ferrule 43 which is disposed in a sleeve 44 for alignment with a lens 46 such that the port 17 is substantially aligned with an optical axis OA of the lens 44.

Figure 9A:
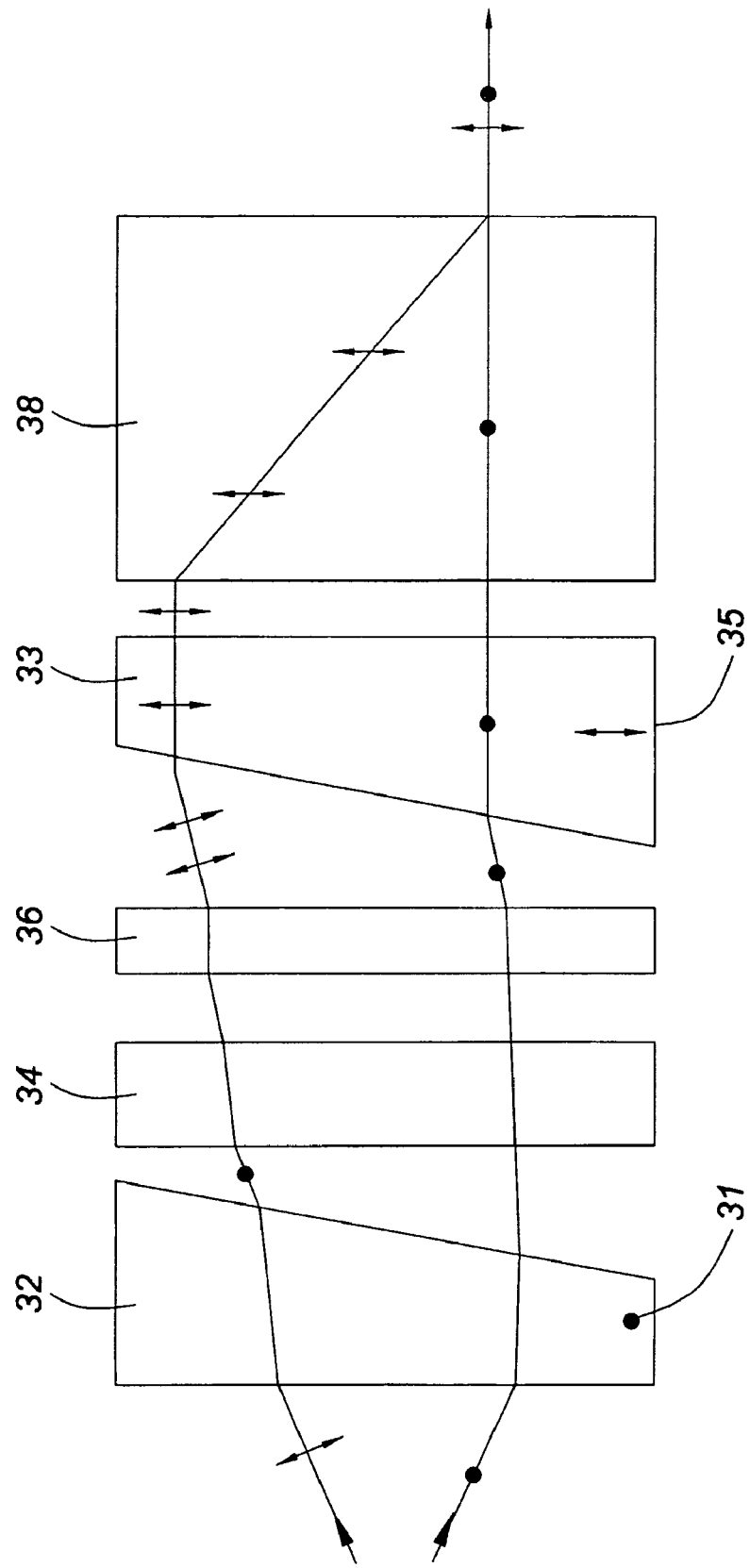
FIG. 9A illustrates the isolated splitter/combiner core of the device of FIG. 8 showing the transmission path, and polarization states of the beams with the device operating as a combiner; and, FIG. 9B illustrates the isolated splitter/combiner core of the device of FIG. 9A showing the isolation of light propagating in a reverse isolation direction in the device operating as a combiner.

Operation of the splitter/combiner 10 can be seen more clearly as shown in FIG. 9A. FIG. 9A shows a ray trace of the principal rays of collimated beams passing through the device 10 in a transmission direction with the device operating as a combiner. Light from the dual fiber collimator 20 is launched into the combiner at opposite and equal angles. The input light comprises orthogonally polarized beams of known polarization from separate sources, for instance two different pump lasers (not shown). The optical axes of the birefringent wedge elements 32,33 are perpendicular to each other. As shown birefringent wedge 32 has an axis 31 projecting from the plane of the page, and birefringent wedge 33 has an axis 35 parallel to the plane of the page.

The the vertically polarized beam ↕, and the horizontally polarized beam ●, pass through the birefringent wedge element 32 on optical paths at different angles of refraction. At the air interface the beams ↕,● are refracted again at different angles, both being affected by the wedge angle of the birefringent element 32. The beams pass through the Faraday rotator 34 and are each rotated by 45 degrees. Each beam proceeds through the half wave plate 36 and is rotated back by 45 degrees, for a net rotation of zero degrees. At each air interface, however, each beam experiences additional refraction. The beams proceed in the original polarization states to the second birefringent wedge element 33. The birefringent material and the wedge angle are selected to provide parallel output beams.

The parallel beams are combined in the birefringent polarization splitter/combiner 38 and output as a beam of mixed polarization at a normal launch angle. The combined beam is coupled into the port 17. Advantageously, because the beam angles are controlled to provide a normal launch angle, substantially all the light is coupled into the fiber 42, without significant insertion loss.

Figure 9B:
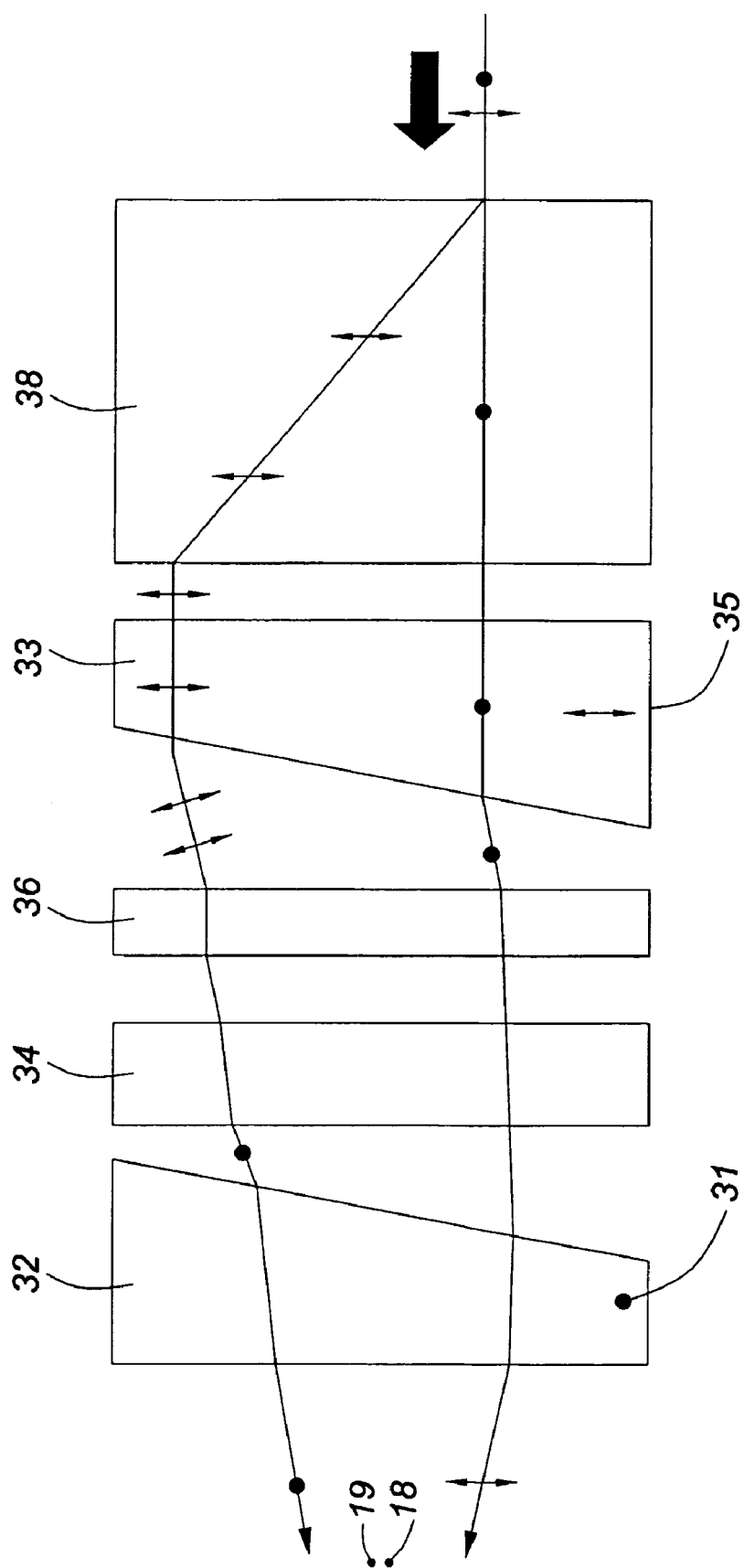

FIG. 9B shows a ray trace of the principal rays of collimated beams passing through the device 10 in an isolation direction with the device operating as a combiner. A beam of mixed polarization is input from port 17 through the single fiber collimator 40. The beam is split by the birefringent polarization beam splitter/combiner 38 into orthogonal polarization components ↕●. The orthogonal beams return on essentially the same optical paths as in transmission. However, by passing in the opposite direction through the non-reciprocal Faraday rotator 34, the rotation of the half wave plate 36 and of the Faraday rotator 34 are combined to produce a rotation of 90 degrees. The beams leave the non-reciprocal rotator 34,36 in opposite polarization states. Thus the beams follow different paths through the first birefringent wedge element 32 and do not couple through the dual fiber collimator 20 to the ports 18,19.

In an alternative embodiment, the axes of the first and second birefringent wedge elements 32, 33 are parallel, and the Faraday rotator 34 is driven to produce, with the half wave plate 36, a 90 degree rotation in transmission. In the isolation direction, no net rotation occurs, but the axis of the second birefringent wedge element prevents the optical paths from coupling to the port(s). This has the advantage that both crystals can be fabricated together, with their axes and parallel wedge angles easily aligned.

Numerous other embodiments can be envisaged without departing from the spirit and scope of the invention defined in the claims.

What is claimed is:

1. An isolated polarizing optical beam splitter/combiner capable of operating as a combiner for combining orthogonally polarized beams of light into a single port in a combining direction, and capable of operating as a splitter for splitting a beam of light into orthogonally polarized beams of light to spatially separated ports in a splitting direction comprising:
- a first port for launching a beam of light into the splitter/combiner when operating as a splitter, and for outputting a combined beam of light from the splitter/combiner when operating as a combiner;
- second and third spaced apart ports for launching orthogonally polarized beams of light into the splitter/combiner for combining and outputting the first port when operating as a combiner, and for outputting orthogonally polarized beams of light, which were input together at the first port, when operating as a splitter;
- a first polarization beam splitter optically coupled to the first port, oriented to provide different optical paths for two orthogonally polarized beams of light;
- a second polarization dependent beam steering means optically coupled to the second and third ports, oriented to provide different optical paths for two orthogonally polarized beams of light;
- a non-reciprocal rotator between the first polarization beam splitter element and at least an element of the second polarization dependent beam steering means for rotating a polarization of each of two orthogonal beams of light and maintaining the orthogonal relationship between them when passing therethrough in one direction, while having substantially no cumulative effect on the polarization of the two orthogonal beams of light when passing in an opposite direction, said non-reciprocal rotator adapted to be driven for transmission in a selected combining direction or a splitting direction,
- wherein, when operating as a combiner and driven in the combining direction, the non-reciprocal rotator permits light to propagate from the second and third ports simultaneously to the first port, and prevents light from coupling from the first port to the second and third ports, and
- wherein, when operating as a splitter and driven in the splitting direction, the non-reciprocal rotator permits light to propagate from the first port simultaneously to the second and third ports, and prevents light from coupling from the second and third ports to the first port.

2. An isolated polarizing optical beam splitter/combiner as defined in claim 1, wherein the first polarization beam splitter element and the second polarization dependent beam steering means comprise a first and a second birefringent element.

3. An isolated polarizing optical beam splitter/combiner as defined in claim 2, wherein the first and second birefringent elements are located in object space or image space.

4. An isolated polarizing optical beam splitter/combiner as defined in claim 3, wherein the non-reciprocal rotator comprises a Faraday rotator.

5. An isolated polarizing optical beam splitter/combiner as defined in claim 4, wherein the non-reciprocal rotator further comprises a half wave plate.

6. An isolated polarizing optical beam splitter/combiner as defined in claim 5, wherein the non-reciprocal rotator provides a rotation of zero degrees in a selected direction and provides a rotation of 90 degrees in a reverse direction.

7. An isolated polarizing optical beam splitter/combiner as defined in claim 6, wherein the first birefringent element and the second birefringent element have rotational axes oriented substantially parallel or antiparallel to each other.

8. An isolated polarizing optical beam splitter/combiner as defined in claim 7, wherein at least one of the first birefringent element and the second birefringent element has an axis oriented for maximum walk-off between the different optical paths.

9. An isolated polarizing optical beam splitter/combiner as defined in claim 4, wherein the first birefringent element and the second birefringent element have rotational axes oriented at substantially 45 degrees to each other and the Faraday rotator provides a rotation of 45 degrees.

10. An isolated polarizing optical beam splitter/combiner as defined in claim 4, wherein the first birefringent element and the second birefringent element have rotational axes which together with a rotation of the non-reciprocal rotator provide efficient coupling in a transmission direction between the different optical paths of the first birefringent element and the different optical paths of the second birefringent element while substantially preventing coupling in an isolation direction.

11. An isolated polarizing optical beam splitter/combiner as defined in claim 3, wherein the non-reciprocal rotator includes at least a pair of aspherical lenses for collimating beams from the first birefringent element to the rotator and for focusing the beams for launching into the second birefringent element.

12. An isolated polarizing optical beam splitter/combiner as defined in claim 3, wherein the first birefringent element has an o-ray path and an e-ray path and the second birefringent element has an e-ray path and an o-ray path such that the e-ray path of the second birefringent element is optically coupled with the o-ray path of the first birefringent element and the o-ray path of the second birefringent element is optically coupled with the e-ray path of the first birefringent element, wherein the different optical paths for two orthogonally polarized beams of light passing through both the first and second birefringent elements have a substantially same optical path length.

13. The isolated polarizing optical beam splitter/combiner as defined in claim 12, wherein the first and the second birefringent elements are substantially of a same optical length.

14. The isolated polarizing optical beam splitter/combiner as defined in claim 12, further comprising a third birefringent element and a second non-reciprocal rotator between the second birefringent element and the third birefringent element.

15. The isolated polarizing optical beam splitter/combiner as defined in claim 14, wherein one of the first, second and third birefringent elements has an optical length equal to a total optical length of the other two of the first, second and third birefringent elements.

16. The isolated polarizing optical beam splitter/combiner as defined in claim 1, wherein the first polarization beam splitter element comprises a birefringent beam splitter element, and the second polarization dependent beam steering means comprises a pair of birefringent elements having parallel wedge surfaces.

17. The isolated polarizing optical beam splitter/combiner as defined in claim 16, wherein the non-reciprocal rotator is disposed between the pair of birefringent elements.

18. The isolated polarizing optical beam splitter/combiner as defined in claim 17, wherein the second and third ports are symmetrically disposed about an axis of an input lens for launching orthogonally polarized collimated beams at equal and opposite angles into a first of the pair of birefringent elements and for receiving orthogonally polarized focused beams.

19. The isolated polarizing optical beam splitter/combiner as defined in claim 18, further comprising a lens optically coupled to the first port for collimating a beam of light launched into the splitter/combiner or for focusing a combined beam of light output from the splitter/combiner.

20. The isolated polarizing optical beam splitter/combiner as defined in claim 19, wherein each birefringent element of the pair of birefringent elements has an optical axis disposed orthogonally to the other.

21. The isolated polarizing optical beam splitter/combiner as defined in claim 20, wherein the non-reciprocal rotator comprises a Faraday rotator and a half wave plate arranged to provide a zero degree rotation in a transmission direction and a 90 degree rotation in an isolation direction.

22. The isolated polarizing optical beam splitter/combiner as defined in claim 19, wherein each birefringent element of the pair of birefringent elements has an optical axis disposed parallel to the other.

23. The isolated polarizing optical beam splitter/combiner as defined in claim 22, wherein the non-reciprocal rotator comprises a Faraday rotator and a half wave plate arranged to provide a 90 degree rotation in a transmission direction and a zero degree rotation in an isolation direction.

24. An isolated polarizing optical beam splitter for splitting a beam of light into orthogonally polarized beams of light to spatially separated ports in a splitting direction comprising:
   a first port for launching a beam of light into the splitter;
   second and third spaced apart ports for outputting first and second orthogonally polarized sub-beams of light, respectively, which were input together at the first port;
   a first polarization beam splitter optically coupled to the first port, for directing the first and second sub-beams along different optical paths;
   a second polarization beam splitter optically coupled to the second and third ports, for directing the first and second sub-beams to the second and third ports, respectively; and
   a non-reciprocal rotator between the first polarization beam splitter and at least an element of the second polarization beam splitter for rotating the polarization of each of the first and second sub-beams of light and maintaining the orthogonal relationship between them when passing therethrough in one direction, while having substantially no cumulative effect on the polarization of the first and second sub-beams when passing in an opposite direction;
   wherein the non-reciprocal rotator permits the first and second sub-beams to propagate from the first port simultaneously to the second and third ports, and prevents light from coupling from the second and third ports to the first port.

25. The beam splitter according to claim 24, wherein the first polarization beam splitter has an o-ray path and an e-ray path, and the second polarization beam splitter has an e-ray path and an o-ray path; wherein the e-ray path of the second polarization beam splitter is optically coupled with the o-ray path of the first polarization beam splitter, and the o-ray path of the second birefringent element is optically coupled with the e-ray path of the first birefringent element; and wherein the different optical paths for the first and second sub-beams passing through both the first and second polarization beam splitters have substantially a same optical path length.

26. The beam splitter according to claim 24, wherein the non-reciprocal rotator comprises a Faraday rotator and a half wave plate arranged to provide a 90° rotation in a one direction and a 0° degree rotation in an opposite direction.

27. An isolated polarizing optical beam combiner for combining first and second orthogonally polarized sub-beams of light into a combined beam of light comprising:
   a first port for outputting the combined beam of light;
   second and third spaced apart ports for inputting the first and second orthogonally polarized sub-beams of light, respectively;
   a first polarization beam splitter optically coupled to the first port, for directing the first and second sub-beams along different optical paths to the first port;
   a second polarization beam splitter optically coupled to the second and third ports, for directing the first and second sub-beams along different optical paths; and
   a non-reciprocal rotator between the first polarization beam splitter and at least an element of the second polarization beam splitter for rotating the polarization of each of the first and second sub-beams of light and maintaining the orthogonal relationship between them when passing therethrough in one direction, while having substantially no cumulative effect on the polarization of the first and second sub-beams when passing in an opposite direction;
   wherein the non-reciprocal rotator permits the first and second sub-beams to propagate to the first port simultaneously from the second and third ports, and prevents light from coupling from the first port to the second and third ports.

\* \* \* \* \*